United States Patent
Lecki et al.

(10) Patent No.: US 8,611,289 B2
(45) Date of Patent: Dec. 17, 2013

(54) CONTROLLING A MOBILE RECEIVER TO RECEIVING SIGNALS DESTINED FOR A PLURALITY OF RECEIVERS

(75) Inventors: Filip Lecki, Nuremberg (DE); Philipp Domke, Nuremberg (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 193 days.

(21) Appl. No.: 12/812,783

(22) PCT Filed: Oct. 28, 2009

(86) PCT No.: PCT/EP2009/064209
§ 371 (c)(1),
(2), (4) Date: Jul. 14, 2010

(87) PCT Pub. No.: WO2011/009499
PCT Pub. Date: Jan. 27, 2011

(65) Prior Publication Data
US 2011/0164513 A1    Jul. 7, 2011

Related U.S. Application Data

(60) Provisional application No. 61/227,995, filed on Jul. 23, 2009.

(51) Int. Cl.
*H04W 4/00* (2009.01)
(52) U.S. Cl.
USPC ........ 370/329; 370/328; 370/437; 455/127.5; 455/517; 455/522; 455/574
(58) Field of Classification Search
None
See application file for complete search history.

(56) References Cited

U.S. PATENT DOCUMENTS

| | | | |
|---|---|---|---|
| 8,023,467 B2* | 9/2011 | Wu et al. | 370/331 |
| 8,054,758 B2* | 11/2011 | Chun et al. | 370/252 |
| 8,169,957 B2* | 5/2012 | Damnjanovic | 370/329 |
| 2006/0240798 A1 | 10/2006 | Jarosinski et al. | |
| 2008/0102880 A1* | 5/2008 | Gholmieh et al. | 455/522 |
| 2008/0167089 A1* | 7/2008 | Suzuki et al. | 455/574 |

FOREIGN PATENT DOCUMENTS

| | | |
|---|---|---|
| EP | 1294206 A2 | 3/2003 |
| EP | 2 076 081 A1 | 7/2009 |
| WO | WO 2008/143563 A1 | 11/2007 |
| WO | WO 2007/148198 A2 | 12/2007 |
| WO | WO 2009/062188 A1 | 5/2009 |

OTHER PUBLICATIONS

ETRI: "DRX control in LTE_Active" 1-15 3GPP Draft; R2-070120_DRX Control in LTE, 3rd Generation Partnership Project (3GPP), Mobile Competence Centre; 650, Route Des Lucioles; F-06921 Sophia-Antipolis Cedex: France, vol. RAN WG2, Sorrento, Italy; 20070112, Jan. 12, 2007, XP050133232.
3GPP TR 25.925, v 3.5.0: *Radio Interface for Broadcast/Multicast Services*, 2004, Chapter 6.3.6.4.

* cited by examiner

*Primary Examiner* — Donald Mills

(57) ABSTRACT

A method and mobile terminal for controlling a radio receiver of the mobile terminal to receive a radio signal transmitted by a telecommunications network to a plurality of mobile terminals. The telecommunications network transmits the signal within a signal frame (FR), the signal including an encoded digital content. The mobile terminal determines a signal quality of the signal, and determines, depending upon the signal quality, a reception time scheme (tr) for the radio receiver. The mobile terminal controls the radio receiver to receive the signal for different time periods in accordance with the reception time scheme, depending upon whether the signal quality is above or below a threshold value.

12 Claims, 5 Drawing Sheets

CONTROLLING A MOBILE RECEIVER TO RECEIVING SIGNALS DESTINED FOR A PLURALITY OF RECEIVERS

This application claims the benefit of U.S. Provisional Application No. 61/227,995, filed Jul. 23, 2009, the disclosure of which is fully incorporated herein by reference.

TECHNICAL FIELD

The present invention relates to channel quality, and specifically to mobile terminals of mobile communications networks.

BACKGROUND

Within current mobile communications networks, the so-called Cell Broadcast is designed for simultaneous delivery of messages to multiple users in a specified area. Cell Broadcast allows transmitting data (e.g. any text or binary message) to all idle mobile terminals connected to one or a set of cells. Cell broadcast messages are usually send periodically with a certain repetition period.

As described e.g. in 3GPP TR 25.925, v 3.5.0, titled "Radio Interface for Broadcast/Multicast Services", 2004, Chapter 6.3.6.4, Cell Broadcast Service/Multicast Service data is received on a broadcast/multicast channel, which has to be available to all users (mobile terminals) in a given cell range. The signal quality (e.g. signal-to-noise ratio SNR) decreases over the distance (schematically shown in FIG. 1) between sender (e.g. a base station) and receiver (e.g. a mobile device also being referred to as user equipment UE, mobile terminal or mobile (phone)). As all the users of said services shall receive the signal irrespective of their current location within the cell range, no power control mechanisms are in place; the signal is transmitted at maximum power (e.g. at a power such that the remotest user will receive the signal with sufficient quality, e.g. signal-to-noise ratio. Thus, users located closer to the base station receive a much stronger signal than the users located at the border of the cell. This means that most of the users will receive signals having higher quality than needed.

Mobile terminals are especially designed to consume as little as possible power in idle mode, (i.e. in a mode, wherein most of the components—including the receiver—are generally disabled, and only to be enabled periodically for short time periods in order to receive information from the network, check the signal power, etc.) However, when e.g. Cell Broadcast Service—CBS—is activated, the stand-by time of the corresponding mobile devices (or user equipments UE) decreases, as (in addition to the discontinuous reception—DRX—cycle) a multiple of CBS occasions need to be received. One solution to avoid such power consumption is to switch-off the CBS service; this however means to (at least temporarily) disconnect from valuable services. Further it is to be noted that CBS might be mandatory in some countries.

With regards to these facts, there might be a high demand to optimizing the reception scheme of broadcasted/multicasted signals (i.e. signals to be received by a plurality of receivers).

SUMMARY

It is an object of the present invention to improve the reception scheme of broadcasted/multicasted signals.

This object is achieved by the independent claims. Advantageous embodiments are described in the dependent claims.

The invention proposes controlling a radio receiver of a mobile terminal of a telecommunications network, wherein the telecommunications network sends a signal within a signal frame to be received by a plurality of mobile terminals, the signal comprising an encoded digital content. Thereto, a reception time scheme for the radio receiver is determined depending on the signal quality to controlling radio receiver accordingly. The reception time scheme might be further dependent on the coding technology (e.g. Turbo Coding or Convolutional Coding) used for encoding the digital content.

The signal quality might be determined by measuring a certain signal quality parameter and determining whether this parameter is above a defined threshold. The signal quality parameter might be one of: an energy/noise power ratio, a received signal strength Indicator, a received signal code power, and a reference signal received power. The defined threshold might be a fixed value or an adaptive value. Further the threshold might be determined autonomously by the mobile terminal alone or might be based on an information received from the network.

In an embodiment, the time scheme comprises one or a plurality of reception time periods during which the radio receiver is controlled to be active, wherein the radio receiver can be controlled to be inactive outside the reception time periods. Thereto, the radio receiver might be turned-on (each) at the beginning of the reception time period(s) and turned-off (each) at the end of the reception time period(s). The reception time period might be chosen to end before the end of a corresponding signal frame and/or to start after the corresponding start of the corresponding signal frame.

In the following, by way of example, the signals transmitted in conjunction with Cell Broadcast or Multicast Services is referred to as CBS signals (each signal comprising one or a plurality of (e.g. two) CBS frames, and the information, data or messages to be decoded from the signal is also being referred to as CBS data.

Depending on the signal quality (and other parameters, e.g. the coding technology), a mobile terminal might reduce the reception time of the CBS signals, so that only a fraction of the signal is received. This is possible as the signals comprise redundancy information that allows to correctly decoding the data from a fraction of the corresponding signals.

In keeping the reception time short, preferably as short as technically possible, the mobile terminal's power consumption especially during the reception of Cell Broadcast or Multicast Services in stand-by time is kept low.

In an embodiment, the reception time is reduced to a time period that the redundancy is reduced to a level that is still or even just sufficient to correctly decode the data.

If it is assumed that the CBS signals are transmitted with maximum power that is sufficient for the most remote mobile terminal (located somewhere at the cell boundary) to correctly decode the corresponding messages even in bad conditions, it is clear that a mobile terminal will nearly always receive more signal information than necessary for decoding; the "redundancy factor" decreases with the distance to the base station.

In an embodiment, controlling the radio receiver is further performed being dependent on a feedback signal from a digital decoder of the mobile terminal to ensure that the reception time is always long enough that the digital content can be correctly decoded, but is not unnecessary long (ideally the reception time is just as long as necessary to correctly decoding). Thereto, the decoder might report if errors have been corrected during the decoding process (and how many); such reporting might be used as a metric for an adaptive algorithm.

In an embodiment, a mobile terminal calculates one or a plurality of signal quality values indicative of the current (cell broadcast or cell multicast) signal quality. Depending on the determined signal quality, the mobile terminal decides whether to shorten a signal reception time or not, i.e. to provide a signal reception time shorter than the signal duration time. This allows reducing the active time of the receiver (e.g. turn-off the receiver earlier and/or turn-on later with respect to the CBS frames) and thus allows decreasing the power consumption of the mobile terminal, as the radio (and therewith the receiver or transceiver) is a part of the mobile terminal that consumes a significant part of the battery power.

In an embodiment, the mobile terminal compares at least one of these values with a predetermined signal quality value. Based on the comparison result, the mobile terminal decides whether to shorten the reception time with respect to the CBS frames or not (e.g. to turn-off the receiver before the end of the corresponding CBS frame or to turn-on the receiver later than the start of the corresponding CBS frame).

In an embodiment, a mobile terminal is provided that comprises a control unit adapted to perform a method described above.

The present invention also concerns computer programs comprising portions of software codes in order to implement the method as described above when operated by a respective processing unit of the mobile terminal. The computer program can be stored on a computer readable medium. The computer-readable medium can be a permanent or rewritable memory within the user device or the recipient device or located externally. The respective computer program can be also transferred to the mobile terminal for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
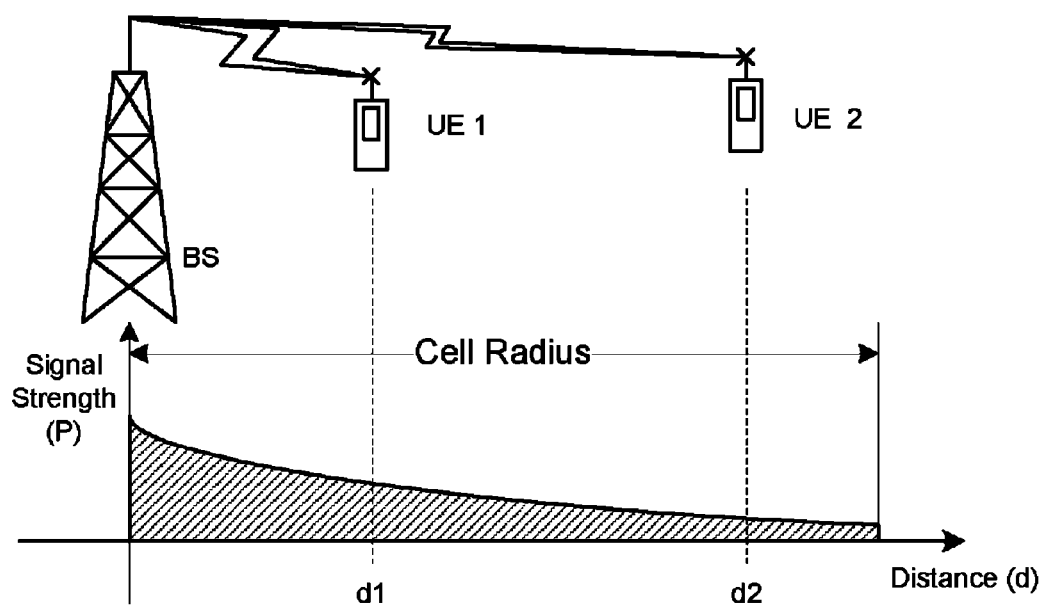
FIG. 1 shows a principle diagram of a sender-receiver distance versus signal strength.

Receivers located close to a sender receive a much stronger signal than the users located remote to the sender. As CBS requires that in principle all mobile terminal users shall be able to receive CBS data the CBS transmission power must be chosen to be high enough that the most remote users (at the cell border) are still able to participate to CBS. Thus, at average, most of the users will receive a signal with a quality higher than needed. For illustration, FIG. 1 shows a principle diagram of a sender-receiver distance d versus signal power P, wherein the sender is a base station BS and the receivers are the mobile terminals UE1 and UE2 within a cell served by the base station BS. By way of example a first mobile terminal UE1 is shown to be at a first distance d1 with respect to the base station and a second mobile terminal UE 2 is depicted. For the example shown here, the signal strength P at the distance d2 is roughly half of the signal strength P at the distance d1; thus the second mobile terminal UE2 will receive the same signal with half the power compared to the first mobile terminal UE1.

Figure 2:
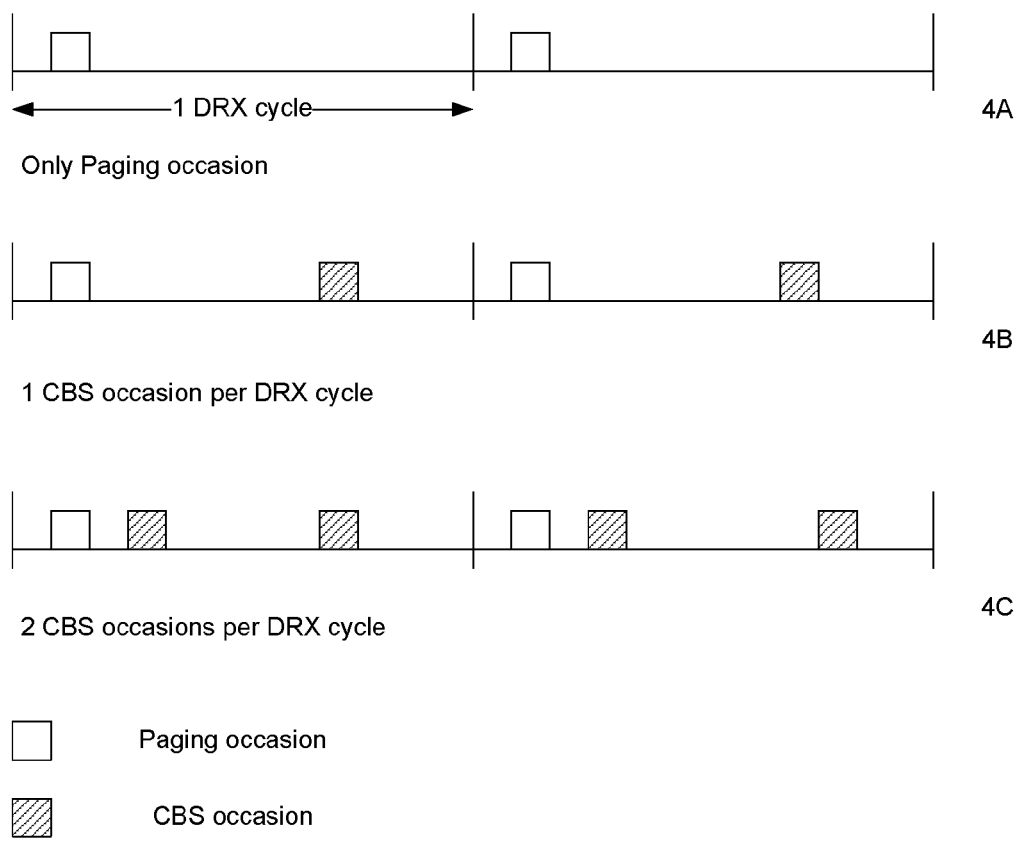
FIG. 2 shows a principle diagram with paging occasions of a DRX cycle versus CBS occasions.

Mobile terminals are designed to consume as little as possible power in idle mode, i.e. if being switched on but not being connected to any other party. However, when Cell Broadcast Service—CBS—activated, the stand-by time of the corresponding mobile devices (or user equipments UE) decreases, as in addition to the discontinuous reception (DRX) cycle, a multiple of CBS occasions need to be received. This can e.g. be seen in FIG. 2 showing three schematic diagrams 4A, 4B and 4C. If CBS is turned-off, the mobile device thus has to listen periodically to just receive paging information. Thereto, it turns on the radio once every DRX cycle. This is depicted in schematic diagram 4A, sowing just one paging occasion per DRX frame. If CBS is turned on, the mobile device has to turn on the radio more frequently. If there is one CBS occasion per DRX cycle as depicted in schematic diagram 4B, the stand-by time will decrease up to 50%, as the mobile terminal has to turn on for two occasions, one paging occasion and one CBS occasion per DRX cycle. If there are more CBS occasions the decrease might be even higher. The schematic diagram 4C by way of example shows a situation of two CBS occasions per DRX cycle.

As suitable channel coding provides effective means of reconstructing a corrupted message from fractions of the respective signal. In other words, the receiver does not need to receive the full signal information for decoding the corresponding message or data carried by the signal. This is especially valid, if the channel is coded e.g. in UMTS Convolutional Coding or Turbo Coding that is used to increase the reliability. Reference is e.g. made to 3GPP TS 25.212, V7.11.0, "Multiplexing and channel coding (FDD)", Section 4.2.3, published September 2009. Thus, according to an embodiment, the signal reception time is purposely cut, whereby the remaining time is long enough to receive enough information so that the mobile terminal is still able to decode the messages within the signal.

According to an embodiment, the switch-off periods of the radio (the time periods wherein the radio receiver is switched to be inactive or non-responsive) is being chosen to be dependent on the signal quality; thus with higher signal quality, the switch-off periods are chosen to be longer (e.g. up to a certain minimum amount. Dedicated figures are dependent on the used coding scheme. As a mere example, it might be possible to cut-off up to 30-40% of the signal e.g. for ⅓ Turbo Coding, (⅓ thereby means that for one information bit there are 2 redundant bits).

According to an embodiment, in order to suitably control the reception time of the receiver, the actual signal quality is determined, and depending on the actual signal quality it is decided whether the radio circuit of the mobile terminal shall receive the whole following CBS signal or whether it is sufficient to receive only a certain fraction of the CBS signal. Accordingly, the radio is controlled to either receive the whole signal or to only receive certain fractions of the signal. In the latter case, the radio can be switched-off e.g. for the rest of the CBS signal.

Depending on the stability of the quality conditions (user fixed or moving, environmental variations etc.), the repetition rate of the quality measurement might be determined (e.g.

performing a measurement with every new frame in unstable radio conditions, or to repeat the measurements e.g. every 6th frame, every 10th frame, or even less frequent in more stable conditions).

The CBS signal might be regarded as a sequence of consecutive CBS or transmission frames, so one frame can be regarded as just a small part of the whole CBS signal. The CBS occasion length might extend just over one or alternatively over a plurality of transmission frames.

Figure 3:
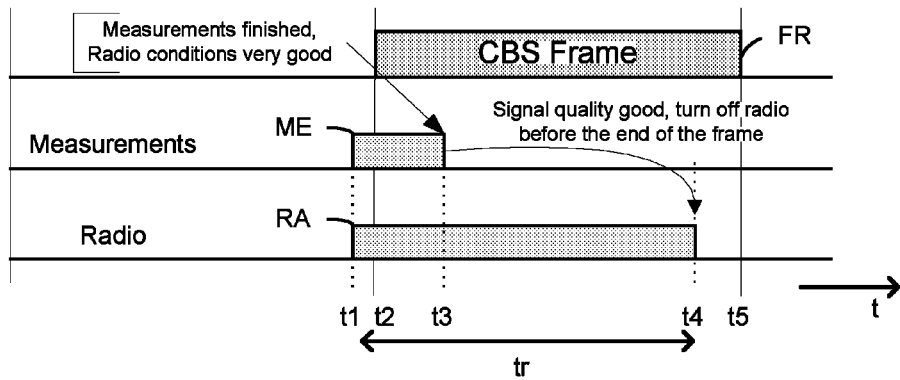
FIG. 3 shows a principle diagram with an exemplary reception scheme for a CBS occasion length of one frame according to the invention.
Figure 4:
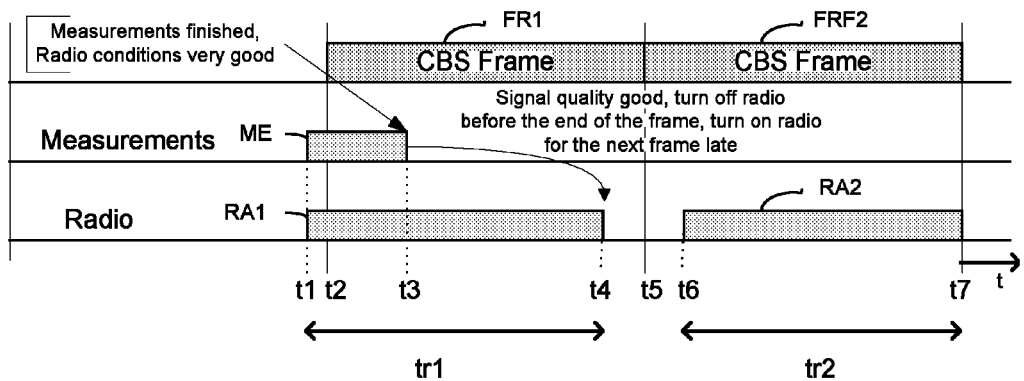
FIG. 4 shows a principle diagram with an exemplary reception scheme for a CBS occasion length of two frames according to the invention.

FIG. 3 exemplarity shows a principle diagram with CBS occasion length of one transmission frame and FIG. 4 exemplarity shows a principle diagram with CBS occasion length of two transmission frames.

Turning to FIG. 3, CBS occasion time durations of a single frame FR, a (signal quality) measurement period ME and a radio activation period RA are shown over the time t. Time points t1 to t5 are depicted on the time axis t, wherein first time point t1 denotes the beginning of the measurement period ME as well as the beginning of the radio activation period RA, second time point t2 denotes the beginning of the CBS occasion frame FR, third time point t3 denotes the end of the measurement period ME, fourth time point t4 denotes the end of the radio activation period RA, and fifth time point t5 denotes the end of the CBS occasion frame FR. The radio reception time tr is denoted as time period between the first time point t1 and the third time point t3.

Signal quality measurement starts a short time (t2−t1) earlier with respect to the CBS frame FR, as the receiver needs to synchronize with the received signal. The necessary synchronization time might depend on the specific hardware and architecture. (This time might be coded in the software being based on the knowledge if the receiver is stable or not).

At the third time point t3, measurements are completed. In this example, it will be assumed that the signal quality is very good (in other words that there is some redundancy reserve within the signal). Due to the redundancy of the CBS signal, it is determined that the radio does not need to receive the whole CBS signal, or in other words, that the radio can be switched-off earlier with respect to the end of the CBS frame FR, in other words that the fourth time point t4 (switch-off time of the radio receiver) can be chosen significantly earlier with respect to the fifth time point t5 (CBS frame end). As qualitatively depicted in FIG. 3, the radio reception time tr is shorter than the CBS frame FR. (It is to be noted that in general, that due to the earlier begin of the measurement period ME with respect to beginning of the CBS frame FR, the reception time tr might be as long or even longer than the CBS frame although a redundancy reserve allows for reducing the reception time of the CBS frame.)

Differently to FIG. 3, FIG. 4 exemplarily shows time durations of two consecutive CBS occasion frames FR1 and FR2 over the time t, wherein the first CBS occasion frame FR1 is similar to the CBS occasion frame FR in FIG. 3. Further, FIG. 4 shows the (signal quality) measurement period ME as shown in FIG. 3 and a first and a second radio activation period RA1 and RA2 over the time, wherein the first radio activation period RA1 is by way of example similar to the radio activation period RA of FIG. 3. Time points t1 to t7 are depicted on the time axis t, wherein first time point t1 to the fifth time point t5 are similar and denote similar events with respect to FIG. 3. Further, a sixth time point t6 denotes the beginning of the second radio activation period RA2 and a seventh time point t7 denotes the end of the second CBS occasion frame FR2 as well as the end of the second radio activation period RA2.

Similarly to FIG. 3, signal quality measurement and consequently the first radio activation period RA1 starts earlier with respect to the (first) CBS occasion frame FR1. At the third time point t3, measurements are completed. Again, by way of example, it is assumed that the signal quality is very good, so that the radio does not need to be active during each the whole period of both CBS occasion frames FR1 and FR2. Similarly to FIG. 3, the radio will be switched-off earlier (time point t4) with respect to the end of the first CBS occasion frame FR1. Additionally, with respect to the begin the begin t5 of the second CBS occasion frame FR2, the second radio activation period RA 2 restarts later at sixth time point t6. By way of example, time difference t6−t5 is similar to time difference t5−t4. As qualitatively depicted in FIG. 4, the sum of radio reception times tr1 and tr2 is shorter than the duration of both CBS occasion frames FR1 and FR2.

Figure 5:
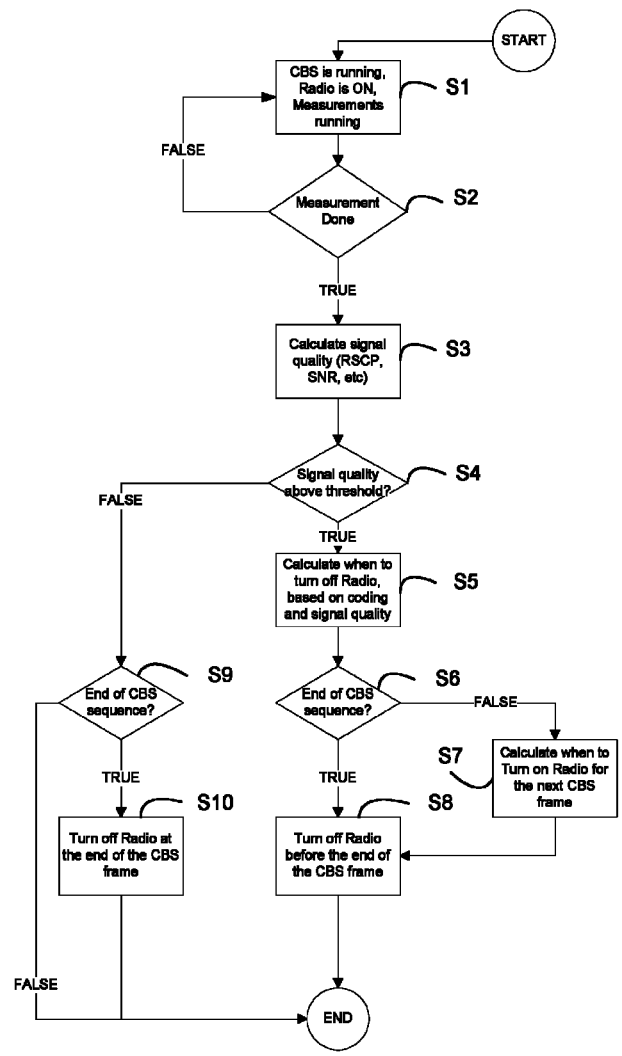
FIG. 5 shows an exemplary flow chart diagram of steps performed in a mobile terminal according to the invention.

In order to describe the above-described process in more details, FIG. 5 shows a flow chart diagram illustrating an exemplary method being performed within a mobile terminal according to embodiments of the invention:

In a first step S1, the mobile terminal performs signal quality measurements (e.g. collecting signal quality parameters) after the radio is turned on for CBS signal reception.

In a second step S2, it is decided whether sufficient measurement data is collected.

In a third step S3, (after having collected sufficient measurement data), the signal quality, e.g. signal-to-noise ratio, or any other signal quality indicator (or quality value) is calculated. Exemplary signal quality values are shown below for exemplarily for GSM/WCDMA/LTE access technologies of mobile communications networks:

GSM (time division multiplex access):
  Energy/Noise Power (Ec/No)
  Received signal strength Indicator (RSSI)
WCDMA (wide band code division multiplex access):
  Received Signal Code Power (RSCP)
  Energy/Noise Power (EC/NO)
LTE (orthogonal frequency division multiplex access):
  Energy/Noise Power (Ec/NO)
  Reference Signal Received Power (RSRP)
  Reference Signal Received Quality (RSRQ)

In the next steps, based on the comparison, a decision is made whether the terminal's radio is controlled such that only a fraction of the CBS frame is received, e.g. the radio is switched off before the end of the CBS frame and/or switched on later with respect to an upcoming CBS frame and further the switch-on/switch-off time points are determined:

In a fourth step S4, the calculated signal quality is evaluated with respect to a certain quality threshold. This can be performed by comparing one of the above signal quality indicators with a certain (predetermined or adaptive) threshold value. The threshold value might be a value stored within the mobile terminal and/or being received from the network. This value might be a predetermined value that might be valid for one or a plurality of cells. Alternatively, this value is an adaptive value e.g. based on recent signal quality measurements within the terminal and/or information received from the network (base station). If the signal quality is above the threshold (TRUE), following fifth step S5 is carried out. Otherwise (FALSE) the next step to be carried out is ninth step S9.

In the fifth step S5, a calculation (and/or estimation) is performed to determine a time point to turn-off the transceiver receiving a CBS occasion frame.

In the sixth step S6, it is determined whether the actual CBS signal (sequence) end with the current CBS occasion frame or whether the CBS signal extends over a further CBS occasion frame. In a case that the current CBS sequence ends at the end of the current CBS occasion frame, the sequence directly branches to the eighth step S8 after the next step. Otherwise, seventh step S7 is carried out.

In the seventh step S7, a time point is calculated to turn on the radio within the next CBS occasion frame (see t6 in FIG. 4).

In the eighth step, the transceiver is controlled to turn-off before the end of that CBS frame (according to the calculated turn-off time calculated in step 5).

As described above, the ninth step S9 is carried out next to fifth step S5 in the case that the signal quality is not above the threshold. Similarly to the sixth step S6, it is determined whether the actual CBS signal (sequence) ends with the current CBS occasion frame or whether the CBS signal extends over a further CBS occasion frame. In a case that the current CBS sequence does not end at the end of the current CBS occasion frame, the radio is not turned off. Otherwise, tenth step S10 is carried out to control the transceiver is controlled to turn-off just at the end of that CBS occasion frame.

The above-described sequence might be repeated every time after performing the measurements, e.g. every time at the beginning of a new sequence, and in the case of a long running CBS read, every time the measurements were done.

Figure 6:
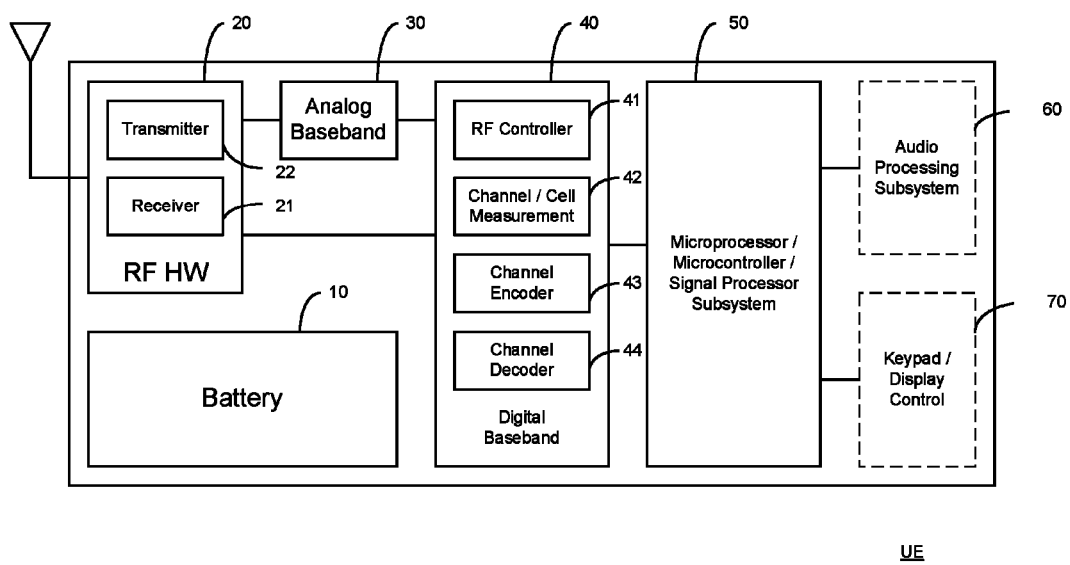
FIG. 6 shows an exemplary block diagram of a mobile terminal according to the invention.

FIG. 6 shows an exemplary simplified block diagram of a mobile terminal UE, wherein this mobile terminal can be any of the terminals UE1 and UE2 discussed above. The mobile terminal UE comprises by way of example a power supply 10, a radio circuit 20 further comprising a receiver 21 and a transmitter 22, an analog baseband circuit 30, a digital baseband circuit 40, a signal processor 50 and optionally an audio processing subsystem 60 and a display control (keypad) 70. The digital baseband circuit by way of example comprises a radio controller circuit 41, a channel/cell measurement circuit 42, a channel encoder 43 and a channel decoder 44.

By way of example, the radio controller circuit 41 controls activation and deactivation of the receiver 21. Measurement results of the channel/cell measurement circuit 42 are retrieved and processed by the microprocessor 50. Depending on the results, the radio controller circuit 41 will be configured by the microprocessor 50 with the minimum reception time for the CBS signal and the switch-on and/or switch-off time point(s) for the receiver 21 accordingly.

In an embodiment, the decoder 44 might provide feedback information to the microprocessor 50 informing about at least one of: information about the current "redundancy reserve", and information whether the current signal was correctly decoded/not correctly decoded. This feedback information might be used to adapt the calculation process of calculation the reception time (or switch-on and/or switch-off time points) with respect to the CBS signal scheme).

The invention allows keeping the active time of the radio circuit 20 for CBS mode short. As the radio circuit 20 consumes a significant portion of the overall energy provided by the power supply 10, a power consumption of the mobile terminal (during active CBS mode) might be significantly reduced. As a result, the stand-by time of the mobile terminal significantly increase. This may further rise the acceptance of CBS and thus might offer a plurality of business opportunities for network/service providers.

As further advantage, the invention allows the mobile terminal to control its power consumption autonomously from the network. Thus, the above-described solutions are compatible with current protocols for the CBS communication between terminal and network described e.g. in the above-cited standard documents.

The invention claimed is:

1. A method of controlling a radio receiver in a mobile terminal to receive a radio signal transmitted by a telecommunications network to a plurality of mobile terminals, wherein the telecommunications network transmits the signal within a signal frame, and the signal includes encoded digital content, the method comprising the steps of:
   receiving the radio signal by the mobile terminal;
   determining by the mobile terminal, a signal quality of the received signal;
   determining by the mobile terminal, depending upon the determined signal quality, a reduced reception time period for the radio receiver to receive and process the signal, wherein the reduced reception time period is determined such that a redundancy of the encoded digital content is still sufficient to correctly decode the encoded digital content; and
   controlling the radio receiver by the mobile terminal to receive and process the signal for the determined reduced reception time period depending upon a feedback signal from a digital decoder of the mobile terminal in order to adjust the reception time period according to a remaining redundancy of the encoded digital content within the received signal.

2. The method according to claim 1, wherein the step of determining the reduced reception time period also includes determining the reduced reception time period depending upon a coding technology used for encoding the digital content.

3. The method according to claim 1, wherein the radio receiver is controlled to turn off a certain time period before the end of a corresponding signal frame.

4. The method according to claim 1, wherein the radio receiver is controlled to turn on a certain time period after the start of a corresponding signal frame.

5. A method of controlling a radio receiver in a mobile terminal to receive a radio signal transmitted by a telecommunications network to a plurality of mobile terminals, wherein the telecommunications network transmits the signal within a signal frame, and the signal includes encoded digital content, the method comprising the steps of:
   receiving the radio signal by the mobile terminal;
   determining by the mobile terminal, a signal quality of the received signal;
   determining by the mobile terminal, depending upon the determined signal quality, a reception time scheme for the radio receiver; and
   controlling the radio receiver by the mobile terminal to receive the signal for different periods of time, depending upon whether or not the determined signal quality exceeds a threshold value;
   wherein the reception time period is reduced when the determined signal quality exceeds the threshold value such that a redundancy of the encoded digital content is still sufficient to correctly decode the encoded digital content; and
   wherein the step of controlling the radio receiver also includes controlling the radio receiver depending upon a feedback signal from a digital decoder of the mobile terminal in order to adjust the reception time period according to a remaining redundancy of the encoded digital content within the received signal.

6. The method according to claim 5, wherein the reception time scheme is adjusted such that the remaining redundancy is zero or almost zero.

7. The method according to claim 5, wherein the step of determining the signal quality includes determining the signal quality by measuring a certain signal quality parameter and determining whether the measured signal quality parameter is above the threshold value.

8. The method according to claim 7, wherein the signal quality parameter is one of:
an energy/noise power ratio;
a received signal strength indicator;
a received signal code power; and
a reference signal received power.

9. The method according to claim 5, wherein the threshold value is one of:
a value stored within the mobile terminal; and
a value received from the telecommunications network.

10. The method according to claim 5, wherein the threshold value is an adaptive value based on recent signal quality measurements.

11. A mobile terminal, comprising:
a radio receiver for receiving a radio signal within a signal frame transmitted by a telecommunications network to a plurality of mobile terminals, wherein the signal includes encoded digital content;
a measurement circuit configured to determine a signal quality of the signal;
a processor configured to determine a reduced reception time period for the radio receiver to receive and process the signal, depending upon the determined signal quality, wherein the reduced reception time period is determined such that a redundancy of the encoded digital content is still sufficient to correctly decode the encoded digital content; and
a controller configured to control the radio receiver to receive and process the signal for the determined reduced reception time period depending upon a feedback signal from a digital decoder of the mobile terminal in order to adjust the reception time period according to a remaining redundancy of the encoded digital content within the received signal.

12. A non-transitory computer-readable medium having computer program instructions stored thereon, wherein when the computer program instructions are executed by a processing unit in a mobile terminal, the processing unit causes the mobile terminal to perform the following steps when a radio receiver in the mobile terminal receives a radio signal transmitted by a telecommunications network to a plurality of mobile terminals:
determining a signal quality of the received signal;
determining, depending upon the determined signal quality, a reduced reception time period for the radio receiver to receive and process the signal, wherein the reduced reception time period is determined such that a redundancy of the encoded digital content is still sufficient to correctly decode the encoded digital content; and
controlling the radio receiver to receive and process the signal for the determined reduced reception time period depending upon a feedback signal from a digital decoder of the mobile terminal in order to adjust the reception time period according to a remaining redundancy of the encoded digital content within the received signal.

* * * * *